(12) United States Patent
Steele et al.

(10) Patent No.: US 7,161,996 B1
(45) Date of Patent: Jan. 9, 2007

(54) MULTI-ANTENNA WIRELESS RECEIVER CHAINS WITH VECTOR DECODING

(75) Inventors: Gregory C. Steele, Fremont, CA (US); D. J. Richard van Nee, De Meern (NL); Vincent K. Jones, IV, Redwood City, CA (US); James Gardner, San Ramon, CA (US); Geert Arnout Awater, Utrecht (NL)

(73) Assignee: Airgo Networks, Inc., Palo Alto, CA (US)

( * ) Notice: Subject to any disclaimer, the term of this patent is extended or adjusted under 35 U.S.C. 154(b) by 0 days.

(21) Appl. No.: 10/376,079

(22) Filed: Feb. 26, 2003

Related U.S. Application Data

(63) Continuation of application No. 10/068,360, filed on Feb. 5, 2002, now abandoned.

(51) Int. Cl.
| | |
|---|---|
| H04B 7/10 | (2006.01) |
| H04B 1/69 | (2006.01) |
| H04B 7/212 | (2006.01) |
| H04B 7/216 | (2006.01) |
| H03H 7/30 | (2006.01) |

(52) U.S. Cl. .................. 375/347; 375/230; 375/146; 370/347; 370/342

(58) Field of Classification Search .......... 370/338, 370/342, 347; 455/137; 375/144, 146, 130, 375/347, 230, 349, 350; 325/147
See application file for complete search history.

(56) References Cited

U.S. PATENT DOCUMENTS

| 6,055,231 A * | 4/2000 | Mesecher et al. ........... 370/342 |
|---|---|---|
| 6,118,806 A * | 9/2000 | Niida et al. .................. 375/148 |
| 6,260,167 B1 * | 7/2001 | Lo et al. ..................... 714/744 |
| 6,304,750 B1 * | 10/2001 | Rashid-Farrokhi et al. . 455/137 |
| 6,661,857 B1 * | 12/2003 | Webster et al. ............. 375/350 |
| 6,670,310 B1 * | 12/2003 | Wojtecki ..................... 508/136 |
| 6,678,310 B1 * | 1/2004 | Andren et al. .............. 375/147 |
| 2001/0036223 A1 * | 11/2001 | Webster et al. ............. 375/152 |
| 2002/0018517 A1 * | 2/2002 | Hara ........................... 375/147 |
| 2002/0083458 A1 * | 6/2002 | Henderson et al. ........... 725/72 |
| 2002/0105375 A1 * | 8/2002 | Sorokine .................... 329/345 |
| 2003/0142726 A1 * | 7/2003 | Eltawil et al. .............. 375/146 |
| 2003/0169711 A1 * | 9/2003 | Borowski et al. ........... 370/338 |

OTHER PUBLICATIONS

A Novel MSW Programmable Barker Coder/Decoder, Talisa, S.H.; Adam, J.D.; O'Keeffe, T.W.;Microwave Symposium Digest, MTT-S International , vol. 86 , Issue: 1 , Jun. 2, 1986, pp. 579-581.*
Andren et al., CCK, the new IEEE 802.11 standard for 2.4 GHz wireless LANs, International IC Conf. ProceedingsMay 3, 2000.*
Andren et al., CCK, the new IEEE 802.11 standard for 2.4 GHz wireless LANs, International IC Conf. Proceedings May 3, 2000.*

* cited by examiner

*Primary Examiner*—Khai Tran
*Assistant Examiner*—Cicely Ware
(74) *Attorney, Agent, or Firm*—Philip H. Albert; Townsend and Townsend and Crew, LLP

(57) ABSTRACT

A receiver chain is provided for use in wireless data communication including a plurality of receive antennas and a vector Barker decoder or a CCK decoder. The vector Barker decoder operates on the plurality of received signals, preferably processed through a plurality of channel matched filters. The weightings of the plurality of channels can be done using a slicer variance, a PLL variance or another method.

48 Claims, 6 Drawing Sheets of a wireless network. Examples of node devices 14
MULTI-ANTENNA WIRELESS RECEIVER CHAINS WITH VECTOR DECODING

CROSS-REFERENCE TO RELATED APPLICATIONS

This application is a continuation of U.S. patent application Ser. No. 10/068,360, filed Feb. 5, 2002 now abandoned entitled, MULTI-ANTENNA WIRELESS RECEIVER CHAINS WITH VECTOR DECODING which is hereby incorporated by reference, as if set forth in full in this document, for all purposes.

BACKGROUND OF THE INVENTION

Wireless networks have become increasingly popular, as computers and other devices can be coupled for data communications without requiring wired connections between the network nodes. One standard for wireless networks is the IEEE 802.11b standard.

A typical node in a wireless network includes a receive chain and a transmit chain and each chain uses only one antenna at a time.

BRIEF SUMMARY OF THE INVENTION

In one embodiment of a wireless node circuit, a receiver chain includes a plurality of antennas and circuitry to process the resulting plurality of signals, including decoding the plurality of signals. In some embodiments, vector Barker decoding is used, while in other embodiments, vector CCK (complimentary code keying) decoding is used and in yet other embodiments, both are used.

In a specific aspect of embodiments of the invention, parameter estimation for channel estimation and noise estimation is done antenna-by-antenna while frequency estimation and data detection for time-averaging are done over the plurality of antennas, thereby obtaining multiple-antenna performance for data detection while still using per-antenna estimates. One benefit of this aspect is that the receiver chain can operate at lower SNRs (even SNRs less than zero, for low data rates).

Even while providing many benefits over other techniques, the multiple receive chain Barker/CCK demodulator system is fully compatible with existing standards, such as the IEEE 802.11 standards. But a few of the advantages are improved range and improved robustness to fading relative to other Barker/CCK demodulation schemes.

An advantage of the combination of multiple channel-matched-filters (CMFs) and weighted combining of signals from a plurality of receive chains is that, with weights chosen as described herein, SINR (signal to interference plus noise ratio) combining is achieved. One approach to obtaining such advantages is to estimate certain parameters (e.g., channel impulse response, correlation peak timing, noise estimation) from the receive signals for use in the combining, but to be able to do so before such SINR combining is fully operational. This constraint is overcome in implementations of the present invention by use of a parameter estimation scheme that provides reliable estimates at low SINR without using the SINR combining scheme. Once the parameters have been estimated, they can then be used in SINR combining for data detection.

With the present invention, multiple signals can be used for parameter estimation as well as for decoding the data from multiple receive chains.

DETAILED DESCRIPTION OF THE INVENTION

Figure 1:
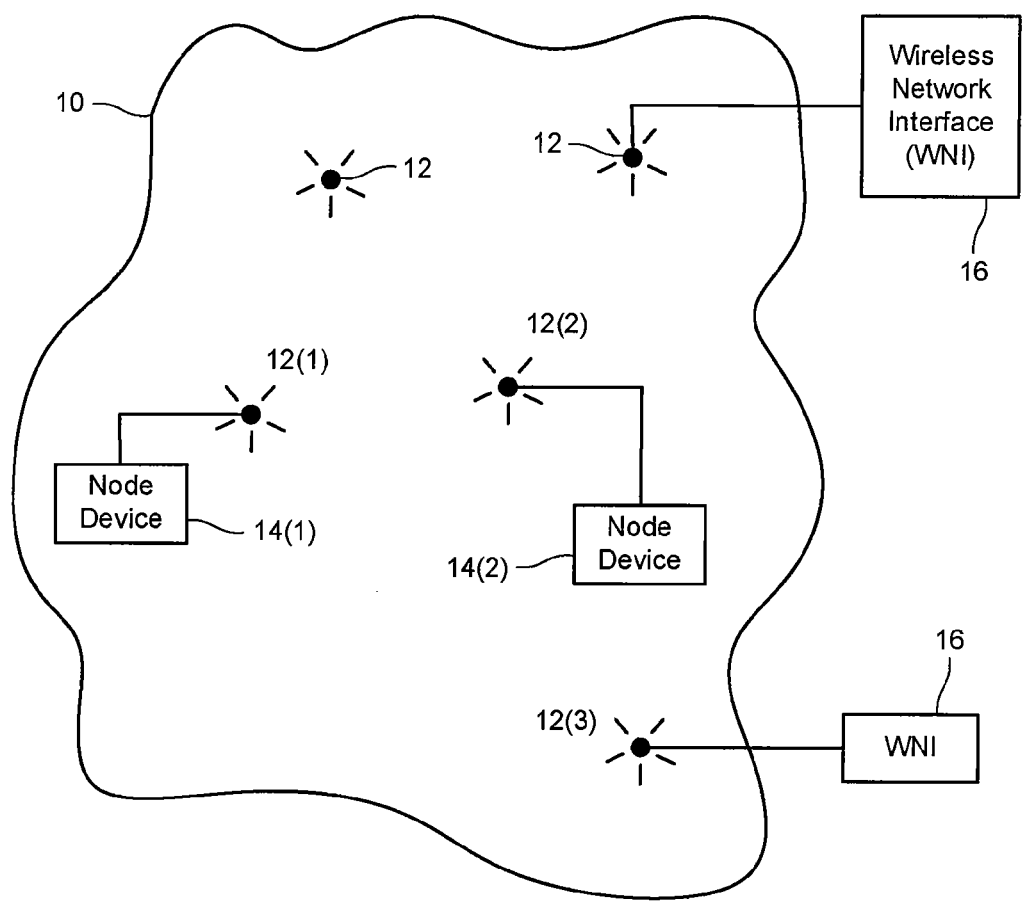
FIG. 1 is a block diagram of a simple wireless network that might use the present invention.

FIG. 1 illustrates a simple wireless network that might use the present invention. As shown there, a wireless network 10 comprises a plurality of nodes 12 wherein each node 12 is capable of communicating with at least one other node 12 of wireless network 10. In specific implementations, wireless network 10 is a local area wireless network, as might be used within a building, campus, vehicle or similar environments. In a specific embodiment, wireless network 10 is designed to be compliant with the IEEE 802.11b standard. However, it should be understood that other standards and nonstandard networks might be substituted therefore. As shown, some of the nodes are coupled to node devices 14, while other nodes are coupled to wired network interfaces 16. For example, node 12(1) is coupled to node device 14(1), while node 12(3) is coupled to a wired network interface 16.

FIG. 1 is intended to be a simplified and generalized diagram of a wireless network. Examples of node devices 14 include laptops, personal digital assistants (PDAs), or any other portable or semi-portable electronic device needing to communicate with other devices, or a stationary electronic device needing to communicate with other devices where a wire connection to a network or the other devices is not available or easily provided. Wired network interfaces 16 coupled their respective nodes to a network. Examples of such networks include the Internet, a local area network (LAN) or a public or private connection to a TCP/IP packet network or other packet networks.

In a typical operation, a plurality of node devices are outfitted with circuitry and/or software that implements a node 12 functionality and one or more network access points are provided in wireless network 10 to provide access between such a node device and the network to which a wired network interface is coupled. In the terminology used here, a node coupled to a node device is referred to as a "station" and a node coupled to a wired network interface is referred to as an "access point". Just one example of the uses of such a system is to connect computers within a building to a network without requiring network wires to be run to each computer. In that example, the building would be outfitted with stationary access points coupled to the network which are within wireless communication range of wireless network cards in each of the computers coupled to the network.

Figure 2:
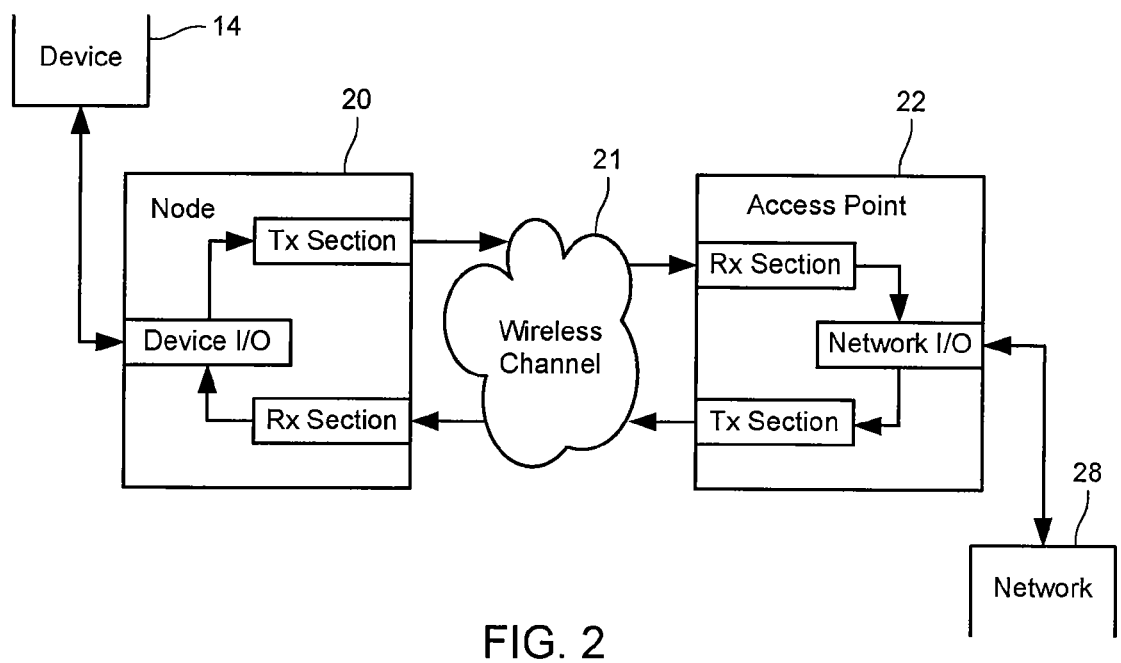
FIG. 2 is a block diagram illustrating the coupling between one device and one network connection of the wireless network shown in FIG. 1.

FIG. 2 shows in more detail the coupling between one device and one network connection. As shown there, device 14 is coupled to a device I/O section of node hardware 20. Node hardware 20 includes a transmitter section and a receiver section, each coupled to the device I/O section. The transmit section transmits a signal through a wireless channel 21 to a receive section of access point hardware 22. That receive section is coupled to a network I/O section, thus providing a data communication path from device 14 to a network 28. A path from network 28 to device 14 is also provided via the network I/O section of access point hardware 22, a transmit section of access point hardware 22, a receive section of node hardware 20 and the device I/O section of node 20. The characteristics of wireless channel 21 depend on many factors, such as the location of node hardware 20 and access point hardware 22 as well as intervening objects, such as walls, buildings and natural obstructions, as well as influences by other devices and transmitters and receivers and signal-reflecting surfaces. Typically node hardware 20 can be integrated in with device 14. For example where device 14 is a laptop computer, node hardware 20 might be an add-on PCMCIA card that is inserted into the laptop's PCMCIA slot. Typically access point hardware 22 is implemented as part of a wired network interface device that is just used to couple a wired network to a wireless network. Notwithstanding the typical implementation, it should be understood that nothing here prevents the diagram of FIG. 2 from being entirely symmetrical, i.e., wherein node hardware 20 and access point hardware 22 are nearly identical instances of hardware devices.

Figure 3:
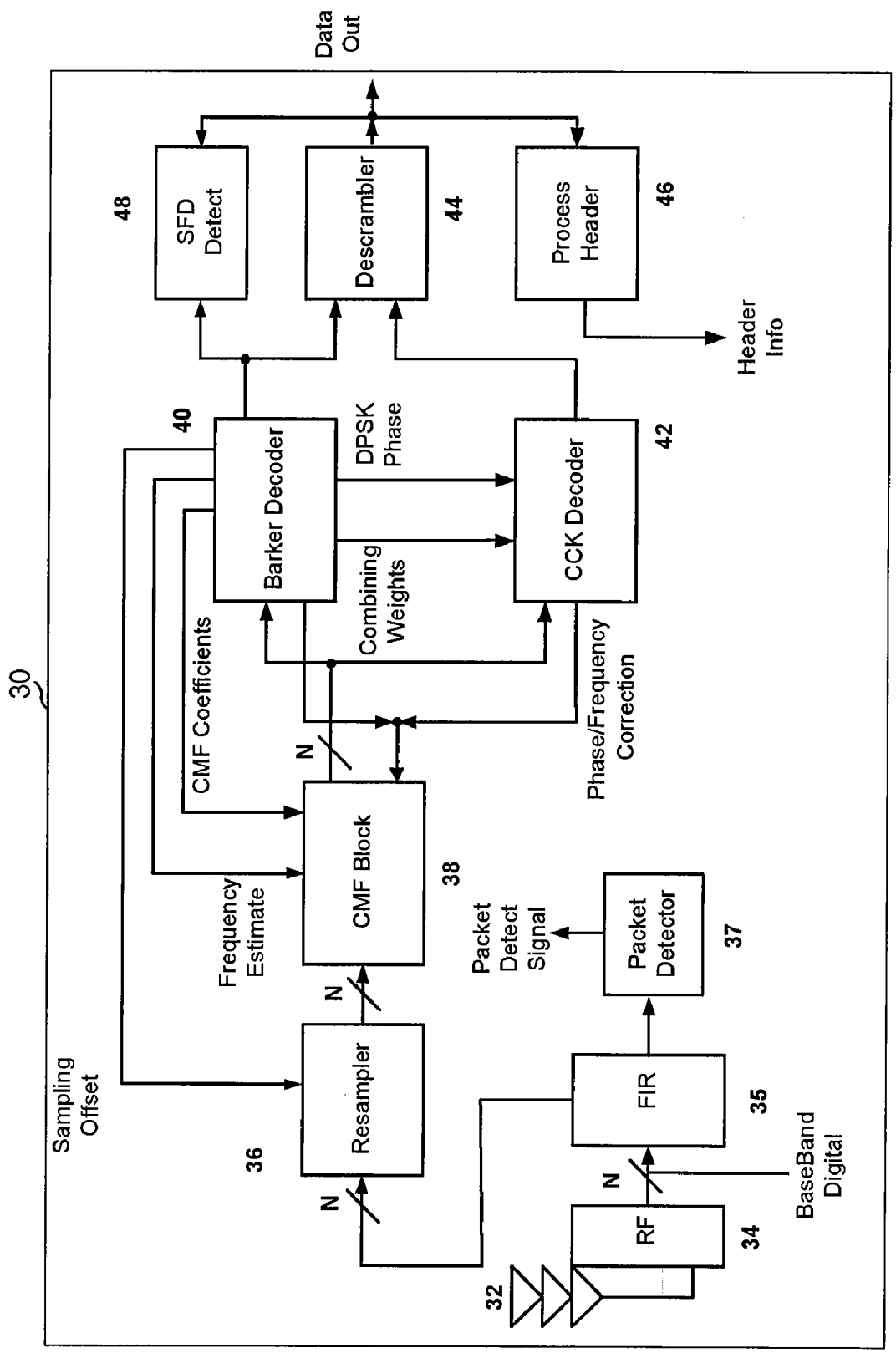
FIG. 3 is a block diagram of a receive section of node hardware as might be used in hardware illustrated in FIG. 2.

What follows is a detailed description of a receive section. FIG. 3 illustrates components of a receive section 30. Receive section 30 receives one or more signals over the wireless channel via antennas 32, which are initially processed by RF section 34. RF section 34 might, for example, process the signals to form baseband signals to form digital signal streams.

As shown, receive section 30 also includes FIR(s) 35, a packet detector 37, a resampler 36, a channel matched filter (CMF) block 38, a Barker decoder 40, a CCK decoder 42, a descrambler 44, an Start Frame Delimiter (SFD) detector 48 detector, and a header processing block 46. Although three antennas/channels are shown with ellipses to indicate more channels, it should be understood that the number of channels, N, could be as low as two or more than three. It should be understood that many of these blocks and elements could be implemented as instructions to be executed by a digital signal processor.

The FIR(s) 35 each receive one or more baseband signals from RF section 34. As described herein, receive section includes a plurality of receive sections. In specific implementations, there is a one-to-one correspondence between physical antennas and receive sections, while in other implementations, there is not a one-to-one correspondence. For example, one receive section might receive signals from an antenna structure that is considered to be more than one antenna.

The signals pass from FIR(s) 35 to resampler 36 and packet detector 37. Packet detector 37 processes the input signals to determine the beginning of a packet and may provide a packet detector signal to other elements to indicate whether any further processing is needed at all. Where the receive section is implemented as instructions for a digital signal processor, the packet detector might be code that determines whether or not a packet is detected and then sets a flag that the processor uses to determine whether to execute the code for the other blocks shown.

Assuming the other blocks are to process data, resampler 36 corrects for sample timing differences between the transmitter D/A and receiver A/D. The resampled signals are then provided to CMF block 38. CMF block 38 provides N signals as its output to both Barker decoder 40 and CCK decoder 42.

Barker decoder 40 is a vector decoder in that it operates on more than one input. Barker decoder 40 receives the N signals from CMF block 38 and in turn outputs Barker bits to descrambler 44 and SFD detector 48. Barker decoder 40 passes CMF coefficients and an Initial Frequency Offset Estimate back to CMF block 38 as well as a phase error vector for frequency/phase tracking. Barker decoder 40 passes combining weights and DPSK demodulator phase to CCK decoder 42, for use in cases where a packet is detected, a Barker preamble is found, and the packet is determined to be CCK coded. Barker decoder 40 also passes a sample timing correction to resampler 36. Because the Barker decoder operates on more than one channel, estimates and outputs are more reliable than single channel results.

For CCK coded packets, CCK decoder 42 outputs data bits to descrambler 44 and also provides phase/frequency correction signals to CMF block 38. Descrambler 44 in turn descrambles the bits provided to it and generates the data output stream. SFD detector 48 takes input bits prior to and after descrambler 44. SFD detector 48 detects the end of the packet preamble. Header processor 46 takes the output bits from descrambler 44 and process the packet header fields. Header processor 46 can begin its processing immediately after the SFD has been detected.

Figure 4:
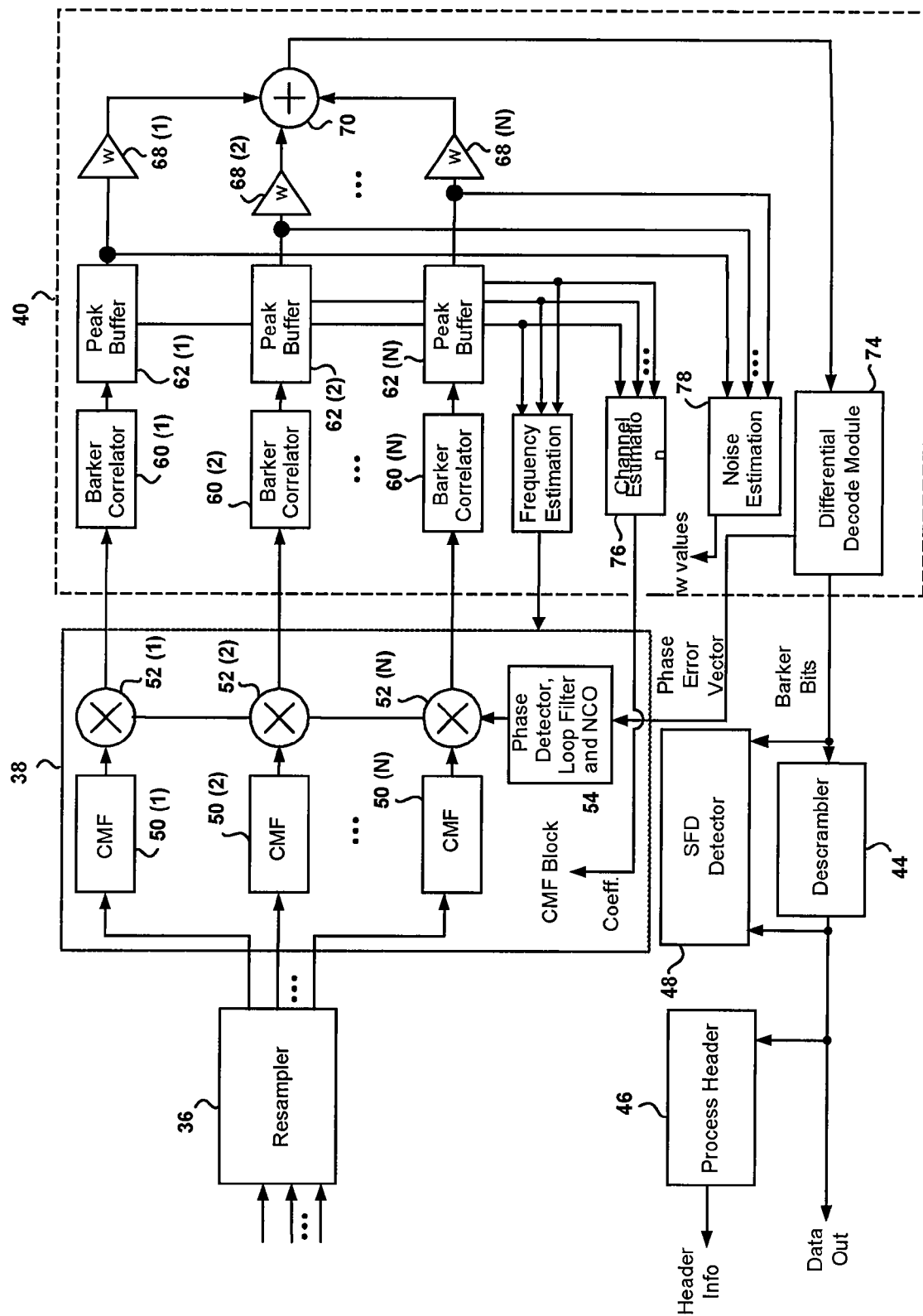
FIG. 4 is a block diagram of a channel matched filter block and Barker decoder as might be used in the receive section of FIG. 3.

FIG. 4 illustrates CMF block 38 and Barker decoder 40 in greater detail. As shown there, CMF block 38 comprises N CMF units 50, each of which is coupled to a multiplier 52 to be multiplied by the output of a loop filter and NCO 54. The outputs of each of CMF units 50 suitably multiplied by multiplier 52 are provided to corresponding Barker correlators 60 in Barker decoder 40. The Barker decoders decimate their input sequence to 1 Msps (megasamples/second) by correlating their input sequences with the decoders' Barker sequence (such as the Barker sequence "10110111000" used in the IEEE 802.11 standard) to form the Barker correlator output. The decimation is accomplished by extracting the one sample out of 22 that corresponds to the correlation peak. The multiple decimated Barker correlator outputs are weighted and summed to form a collective decimated Barker correlator output. In particular, the output of each Barker correlator 60 is provided to a peak buffer 62. The length of the peak buffers 62 (in samples) corresponds to one Barker symbol. One sample within each peak buffer 62 will correspond to the correlation peak. These values are extracted from each peak buffer 62, are weighted by amplifiers that form a channel combiner 68, and summed by summer 70.

The output of summer 70 is provided to slicer/DPSK decoder 72. Slicer/DPSK decoder 72 generates the Barker decoded header and data bits. In addition, slicer/DPSK decoder 72 generates a phase error vector that is sent to CMF Phase Detector 54 in CMF block 38. Included in Barker decoder 40 is functionality to estimate the frequency offset between transmitter and receiver, the timing of the correlation peak, the channel impulse response for each receive chain, as well as the noise power on each receive chain. In addition, Barker decoder 40 can compute the sample timing offset from the frequency offset.

Figure 5:
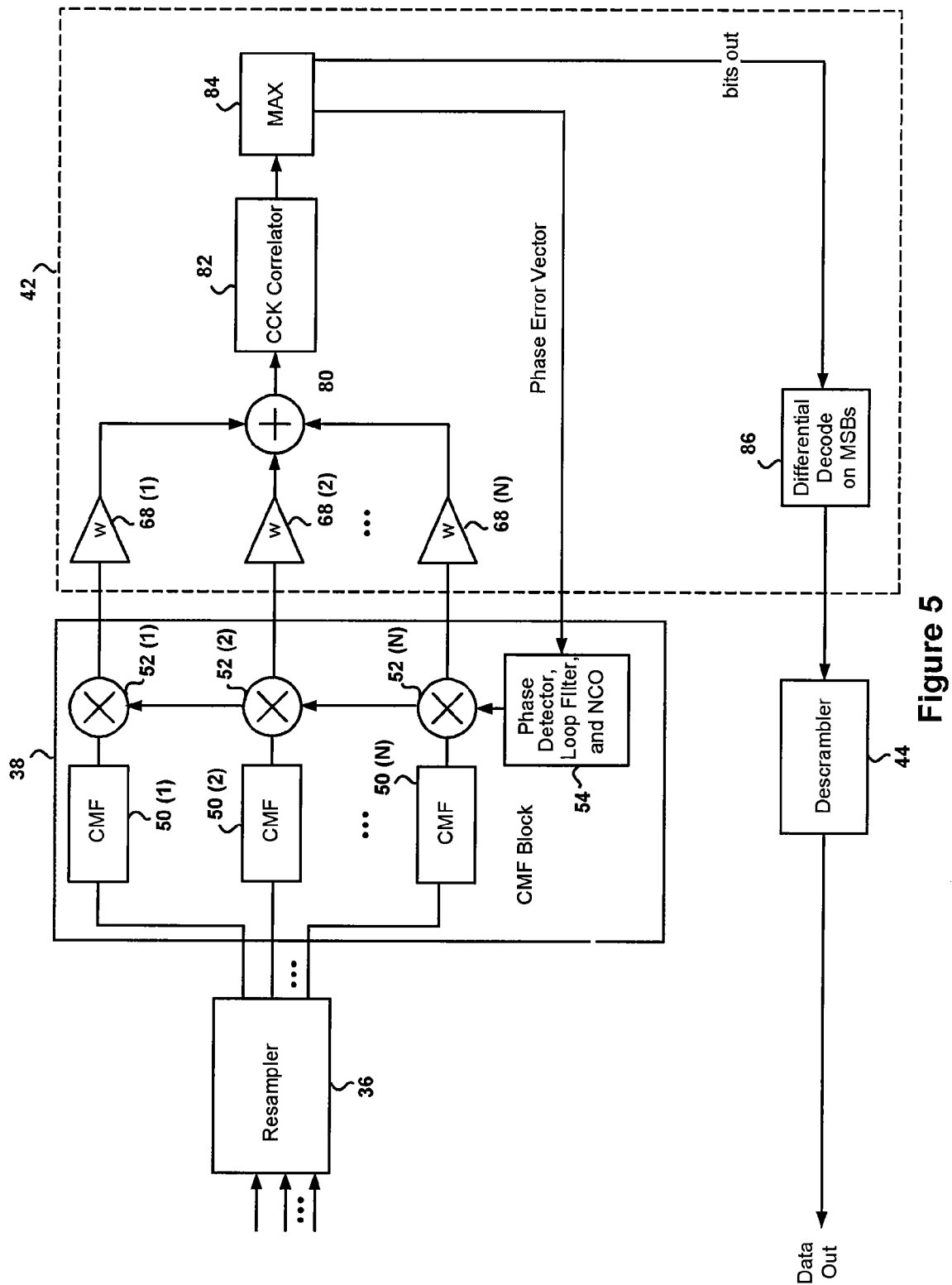
FIG. 5 is a block diagram of a channel matched filter block and CCK decoder as might be used in the receive section of FIG. 3.

FIG. 5 shows CCK decoder 42 in greater detail. Each of the outputs of multipliers 52 of CMF block 38 are provided to amplifiers 78, which weights the signals and provides them to summer 80. The output of summer 80 is provided to a CCK correlator 82, which outputs to a maximum selector 84.

The CCK correlator 82 acts on one CCK symbol at a time. Symbol boundaries are obtained from Barker Decoder 40 symbol timing. The maximum selector generates output bits corresponding to CCK correlator 82 output with maximum absolute in-phase or quadrature component. In addition, maximum selector 84 generates a phase error vector that is passed to CMF phase detector 54 in CMF block 38. The output bits from maximum selector 84 are provided to a differential decode module 86 that differentially decodes the two most significant bits and in turn outputs the CCK bits to descrambler 44.

Figure 7:
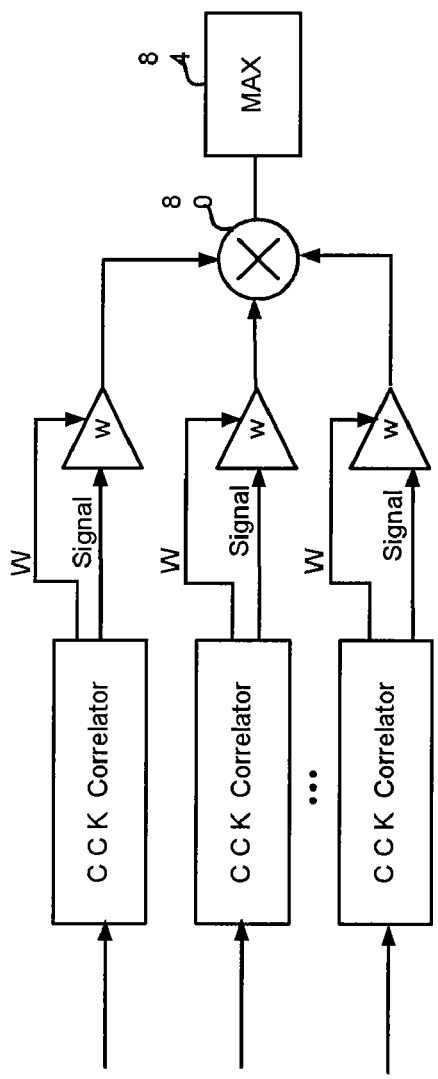
FIG. 7 is a block diagram of an alternate embodiment of the CCK decoder of FIG. 3.

FIG. 7 illustrates an alternative embodiment of the CCK decoder, wherein the receive signals are correlated individually and the results of the correlation lead to a weighting among the signals, which is used to weight the symbols before they are combined.

Packet Reception

Figure 8:
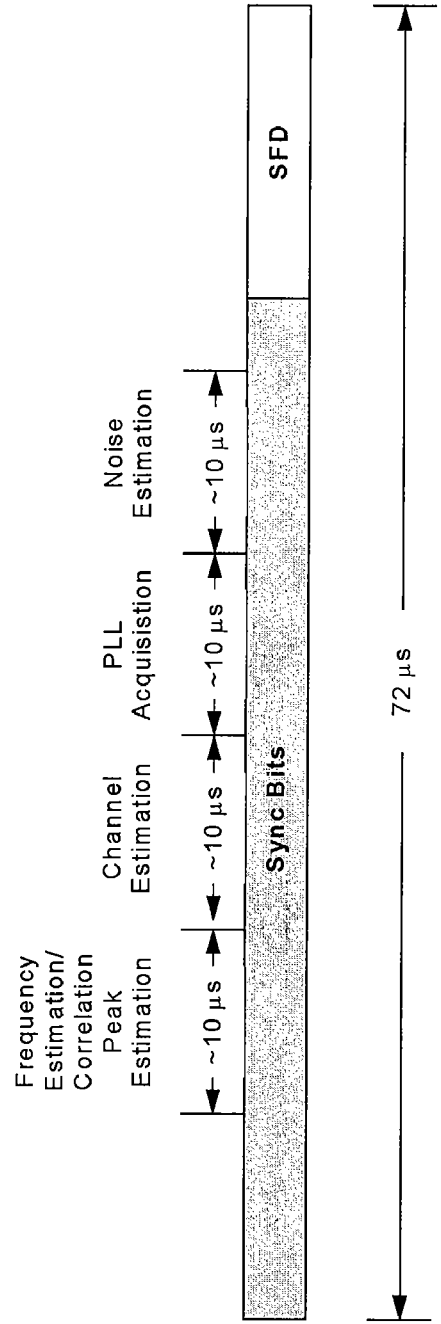
FIG. 8 is a timing diagram of a parameter estimation process.

The first step in packet reception is the detection of a packet. This is accomplished in the packet detector 37. Once a packet has been detected (according to processes described herein or other processes), the parameter estimation process begins. The preamble of an 802.11b packet comprises sync bits that do not contain data. This time is used to estimate signal and channel parameters. FIG. 8 displays a timeline of the parameter estimation steps that take place during the packet preamble. The timeline is drawn relative to the preamble for the short 802.11b packet preamble. Parameter estimation does not necessarily begin at the beginning of the packet due to ambiguity in packet detection. This potential delay is depicted in FIG. 8.

The frequency offset estimation and Barker correlation peak timing are estimated jointly as described herein. The sample timing offset is computed from the frequency offset and sent to the resampler 36. The frequency offset is sent to the CMF block 38 to be loaded into the memory element in the pole 96 of the PLL loop filter. The correlation peak timing is used to adjust the timing of the samples into the peak buffer 62 so that the maximal channel energy lies in the center of the peak buffer 62.

The channel estimation procedure begins after the frequency/correlation peak estimation has completed and appropriate parameters have been loaded. Once the channel impulse responses have been estimated, CMF coefficients are computed and sent to the CMF block 38 to be loaded into the CMF elements 50. Once the CMF coefficients have been loaded, one symbol is allowed to propagate from the CMF 38 through the Barker Decoder 40 to allow the system to flush. The location of the Barker correlation peak will have changed. The new location corresponds to the first sample in the peak buffer 62 that is used for the channel estimation.

At this point, the Barker decoder 40 begins computing phase error vectors for the PLL. The PLL is allowed 10 μs to acquire. Once the PLL has acquired, the noise estimation procedure begins. The noise estimation takes 10 μs. After the noise estimation completes the combining weights are computed. These weights are used in channel combiner 68 in Barker decoder 40 and are sent to CCK decoder 42 to be used in channel combiner 78.

SFD detector 48 correlates the receive bits with the two SFDs. Once an SFD is detected, header processing 46 begins. The header processor 46 determines, among other things, what type of modulation is used in the packet body. Once the header is completed, the appropriate decoder is switched on/off and packet reception proceeds.

Peak Estimation

The Barker correlation peak is determined for other parameter estimation steps as well as data detection. One method of determination is to find the sample that provides the maximum magnitude value in peak buffer 62. The location of this sample in peak buffer 62 is an estimate the correlation peak location. The location can be more robustly determined by time-averaging the sum, across receive chains, of the magnitude of peak buffers 62. This is shown by:

$$d_l = \sum_{k=1}^{L} \sum_{i=1}^{N} |p_l^{(i)}(k)|$$

where $p^{(i)}(k)$ refers to the k-th set of 22 samples from the i-th receive chain and $p_l^{(i)}(k)$ refers to the l-th sample of that set. The location of the maximum value of $d_l$ is an estimate of the location of the Barker correlation peak. A reasonable value for L is 10, although other values can be used.

Frequency Estimation

Residual frequency offset should be corrected to increase data detection performance. An initial frequency offset is estimated and used to initialize phase-lock loop 54. One approach to estimation is to compute the cross-correlation between the correlation peak of a current symbol and the correlation peak from a previous symbol. That is, assume that l' indexes the correlation peak from one of the peak estimation steps described above. The cross-correlation for one receive chain is:

$$\tilde{r}^{(i)} = p_{l'}^{(i)}(k)(p_{l'}^{(i)}(k-1))^*$$

The value $\tilde{r}^{(i)}$ is a vector in the complex plane. Mapping this value to the positive real half-plane can be done as follows:

$$r^{(i)} = \begin{cases} -\tilde{r}^{(i)} & \text{Re}\{\tilde{r}^{(i)}\} < 0 \\ \tilde{r}^{(i)} & \text{otherwise} \end{cases}.$$

The argument of the resulting vector represents the phase change between two consecutive symbols. For a symbol rate of 1 Msps, the argument of this value corresponds to a frequency offset of:

$$f^{(i)} = \frac{\arg r^{(i)}}{2\pi} \times 10^6 \text{ Hz}.$$

The values, $r^{(i)}$, can be averaged across the receive chains to provide a more robust estimate. That is:

$$r = \sum_{i=1}^{N} r^{(i)}$$

The frequency estimate for a symbol rate of 1 Msps would then be:

$$f = \frac{\arg r}{2\pi} \times 10^6 \text{ Hz}$$

This estimation procedure can be made more robust by time averaging the r values.

$$R = \sum_{k=1}^{L} r(k)$$

A reasonable value for L is 10, although other values can be used. The frequency offset estimate for a 1 Msps is:

$$f = \frac{\arg R}{2\pi} \times 10^6 \text{ Hz}$$

The frequency offset for other symbol rates can be computed accordingly.

For IEEE 802.11b compliant devices, it is common to couple the transmitter sampling and frequency clocks. If that is done, an estimate of the sampling offset can be computed from the estimated frequency offset. Assume that the nominal carrier frequency is $f_c$. The ratio of the frequency offset to nominal carrier frequency is $$\eta = \frac{f}{f_c}.$$

Since the sampling and frequency clocks are coupled, the sampling offset and nominal sampling rate will have the same ratio. That is, the sampling offset, $\psi$, is given by $$\psi = \eta \psi_{nominal}$$

where $\psi_{nominal}$ is the nominal sampling rate.

Channel Estimation

The channel estimate is conducted by time-averaging the contents of the peak buffers 62, or a subset thereof. For time averaging, symbol decisions are computed by slicing the inner product of a symbol and accumulator. For example, the estimates can be initialized to:

$$b_l^{(i)}(0) = p_l^{(i)}(0)/L$$

Those estimates are then updated, using the following inner product. The following inner product (over all receive chains and all 22 Barker samples of a Barker symbol) allows for the removal of the differential data from the contents of the peak buffer in order to do time-averaging. Although the peak buffer contents are accumulated on a per receive chain basis, the data detection is conducted across receive chains. This use of multiple receive chains for the data detection is more reliable than a single-chain estimate.

$$x = \sum_{i=1}^{N} \sum_{l=1}^{22} p_l^{(i)}(k) b_l^{(i)}(k-1)^*$$

-continued $$s = \begin{cases} 1 & x > 0 \\ -1 & x < 0 \end{cases}$$

$$b_l^{(i)}(k) = b_l^{(i)}(k-1) + s \cdot p_l^{(i)}(k)/L$$

In the above equations, $p^{(i)}(k)$ refers to the k-th set of 22 samples from the i-th receive chain and $p_l^{(i)}(k)$ refers to the l-th sample of that set. An alternative approach would be to perform the data detection on the inputs to the Barker correlator. This might implemented by an inner product similar to the double summation to x shown above, but conducted between the inputs to the Barker correlator and a buffer accumulating inputs to the Barker correlator. The updating step is repeated L times. A suitable value for L is L=10. Longer values might be better if more time for updating were available, but L=10 provides good results and balances the cost of taking more time with the benefits of improving estimation. After accumulating or averaging the impulse responses for L symbols, a subset of the 22 conjugated $b_l^{(i)}$ values are used as CMF coefficients, as follows:

$$l' = \underset{l}{\arg\max} |b_l^{(i)}|$$

$$c_l^{(i)} = \frac{b_l^{(i)}}{|b_{l'}^{(i)}|}.$$

Note that the division by L in the above equations can be omitted, resulting in an accumulation instead of an averaging, without impacting the channel estimation, because L cancels out.

Noise Estimation

The noise estimation is conducted to estimate the SNR from the 11-bit Barker preamble on each receive chain and uses this estimate to generate combining weights for optimal combining. There are several ways to estimate the noise power. Two such procedures use either the quadrature component of the Barker correlation peak, or the output of a Costas phase-error detector. For these procedures, the estimate is initialized to:

$$m^{(i)}(0) = 0$$

and the error is computed as:

$$e^{(i)}(k) = \{\sigma(x^{(i)}(k)) - x^{(i)}(k)\}$$

for slicer error and $$e^{(i)}(k) = \{\sigma(x^{(i)}(k)) Im x^{(i)}(k)\}$$

for Costas error (BPSK), where $$\sigma(x) = \begin{cases} 1 & \text{Re} x > 0 \\ -1 & \text{Re} x < 0 \end{cases}$$

and the estimate is updated:

$$m^{(i)}(k) = m^{(i)}(k-1) + |e^{(i)}(k)|^2$$

This is repeated to accomplish time accumulation over a number of symbols. Another procedure by which the noise power can be estimated is to take the difference between the average power of the Barker correlation peak and cross-correlation between subsequent correlation peaks. That is $$h(k) = \begin{cases} -p_{l'}^{(i)}(k)(p_{l'}^{(i)}(k))^* & \text{Re}\{p_{l'}^{(i)}(k)(p_{l'}^{(i)}(k))^*\} < 0 \\ p_{l'}^{(i)}(k)(p_{l'}^{(i)}(k))^* & \text{otherwise} \end{cases}$$

$$e^{(i)}(k) = |p_{l'}^{(i)}(k)| - h(k)$$

The value $m^{(i)}(k)$ is accumulated as above. The reciprocals of the resulting values are scaled and used as combining weights, as follows:

$$w^{(i)} = \frac{a_m^{(i)}}{m^{(i)}}$$

where $a_m^{(i)}$ is an estimate of the signal power of the i-th receive chain. There are a number of ways to obtain estimates, $a_m^{(i)}$, of the signal power. They can be computed directly from the CMF weights:

$$a_m^{(i)} = \sum_l |b_l^{(i)}|^2$$

They can also be estimated by time-averaging the magnitude-squared output of the Barker correlator:

$$a_m^{(i)} = \sum_n |p_{l'}^{(i)}(n)|^2,$$

in which l' indexes the Barker correlation peak.

The weights $w^{(i)}$ are used for channel combining (via elements 68 in the Barker decoder and elements 78 in the CCK decoder). Since the matched filter essentially weights the input signal by the square root of the signal power, the estimated noise power is equal to the product of noise power and signal power. The weights $w^{(i)}$ are equal to the input power with the CMF in its initial state divided by the noise power after channel estimation, which is equivalent to the inverse of the input noise power. Hence, the overall weighting factor for each receive chain is proportional to the square root of the signal power divided the noise power, which is the optimum weighting factor in terms of maximizing output SNR.

Using the channel-matched filters (CMFs) as described herein, the CMFs can maximize the signal-to-noise ratio (SNR) on each individual receive chain. By employing multiple receiver chains and vector decoding with SNR based combination, the effects of spatially dependent multipath fading can be mitigated.

Phase Lock Loop

Each decoder 40 and 42 generates a phase-error vector during data detection. This phase-error vector is passed to the phase-detector in the CMF Block 38. The phase-error vector is generated by taking the (combined) output of the correlator(s) in the CCK decoder 42 (Barker decoder 40) and mapping it the complex right half-plane according to the following rule.

phase error vector=$y^*\sigma(y)^*$ in which $\sigma(y)$ is the sliced value of the correlator output y.

Figure 6:
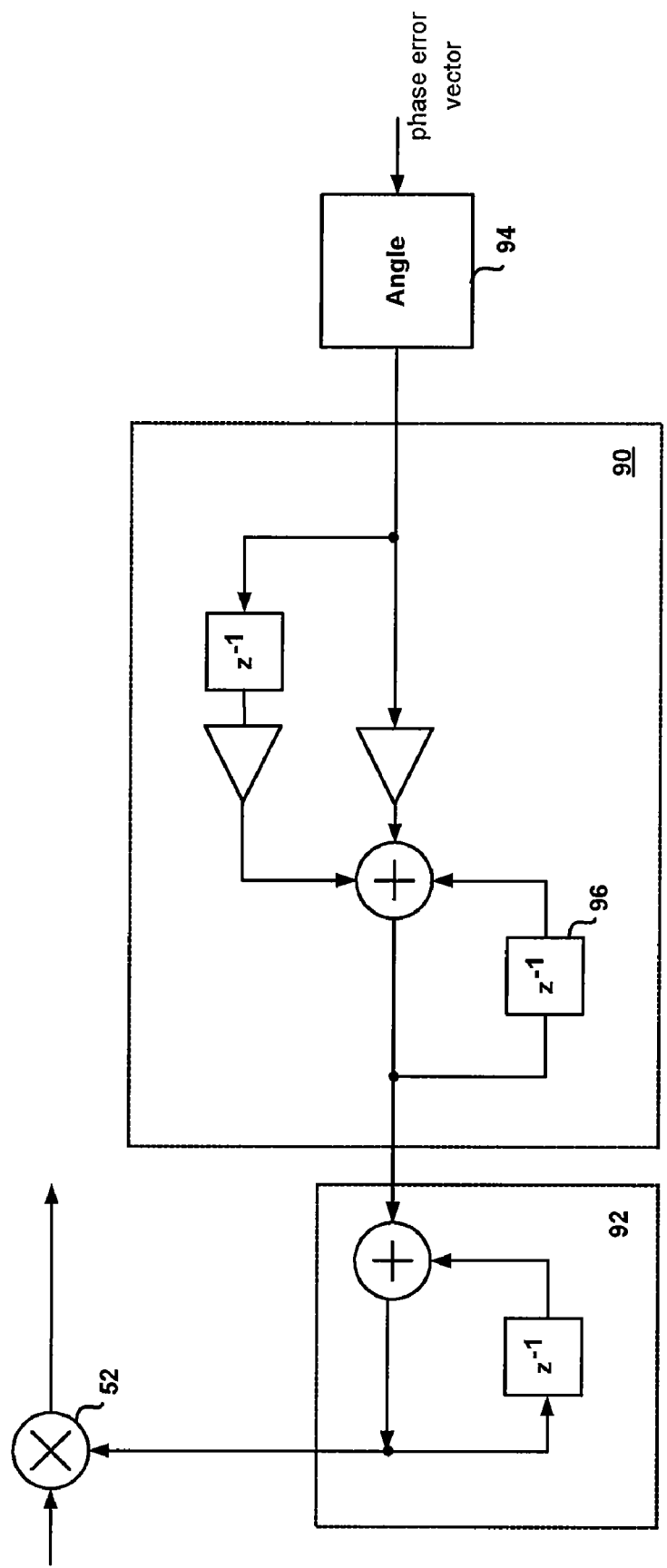
FIG. 6 is a block diagram of the phase-lock loop detail of FIG. 5.

FIG. 6 is a detailed diagram of the PLL functions in the CMF block 38. In the CMF block 38, the angle of the phase error vector is computed 94 and passed to the loop filter 90. The output of the loop filter is sent to an "NCO" 92, which overflows at a rate corresponding to the estimated frequency offset. The output of the "NCO" 92 is used to rotate the outputs of the CMFs 50 at the multipliers 52.

The memory element 96 in the pole of the loop filter is initialized with the frequency offset estimation from the Barker decoder 40.

The phase-lock loop is operational only after the CMF weights have been applied. The CMF coefficients will rotate the signals from the multiple receive chains to have common phase. This allows the use of one phase detector, one loop filter, one oscillator to track frequency/phase changes across multiple receive chains. Other implementations could use multiple phase detectors, loop filters, oscillators or combinations of various numbers of such circuitry. Using multiple phase detectors provides an alternative approach to estimate the per receive chain noise.

Slicer/DPSK Demodulation

This operation is performed in Slicer/Differential Decode 72 in Barker decoder 40 and is split between the max select 84 and differential decode 86 in CCK decoder 42. For BPSK, the process is as follows. First, the symbol is sliced:

$$\sigma_{BPSK}(x) = \begin{cases} 1 & \text{Re}x > 0 \\ -1 & \text{Re}x < 0 \end{cases}$$

$$\hat{x}(k) = \sigma(x(k))$$

then hard decisions are differentially decoded:

$$\Delta(k) = \hat{x}(k)\hat{x}(k-1)^*$$

and Δ is used to address a data look up table (LUT):

| Phase Change | Output Bits |
|---|---|
| 0 | 0 |
| π | 1 | to determine which bit to output. For QPSK, the process is similar. First, the symbol is sliced:

$$\sigma_{QPSK}(x) = \begin{cases} 1 & |\text{Re}x| > |\text{Im}x| & \text{Re}x > 0 \\ -1 & |\text{Re}x| > |\text{Im}x| & \text{Re}x < 0 \\ j & |\text{Re}x| < |\text{Im}x| & \text{Im}x > 0 \\ -j & |\text{Re}x| < |\text{Im}x| & \text{Im}x < 0 \end{cases}$$

$$\hat{x}(k) = \sigma(x(k))$$

then hard decisions are differentially decoded:

$$\Delta(k) = \hat{x}(k)\hat{x}(k-1)^*$$

and Δ is used to address a data look up table (LUT):

| Phase Change | Output Bits |
| --- | --- |
| 0 | 00 |
| π/2 | 01 |
| π | 11 |
| 3π/2 | 10 |

While the above two codings might be all that is needed to implement a receiver, such as in an 802.11 compliant or 802.11 variant receiver, other codings might be used and similar SFD detection might be performed in such cases.

SFD Detection

The Start Frame Delimiter (SFD) is detected to determine the beginning of the Packet Header. There are two distinct 16-bit SFD patterns, one for the long header and one for the short header. There are several approaches to SFD detection. One approach is to compare the output of descrambler 44 versus the two SFD patterns. Another approach is to compare the output of descrambler 44 versus the SFD pattern for the long header and the input to descrambler 44 versus the scrambled SFD pattern for the short header. The scrambled SFD pattern for the short header is predictable since the packet preamble and scrambler initialization state are specified in the 802.11b standard. This approach may be beneficial, since it removes scrambler initialization latency from the time required to detect the SFD pattern for the short header. Previous approaches compared Barker decoder output bits versus the SFD bit patterns. For the SFD associated with the short header, SFD detection can be done on the output of the Barker Correlator. Essentially, the scrambled bit pattern for the SFD is modulated using DBPSK to act as a soft decision correlator. One such correlator can be used for the output of the channel combiner. Alternatively, one SFD correlator could be used for each receive chain. The outputs of the correlators are combined using the weights for channel combiner 68. This value is compared to a threshold to determine whether the SFD is present.

What is claimed is:

1. A receiver usable for wireless data communication, comprising:
   a plurality of receive antennas, wherein each receive antenna can receive a received signal; and
   a vector Barker decoder, wherein the vector Barker decoder operates on the plurality of received signals, thereby outputting a decoding signal that is dependent on at least two of the plurality of received signals.

2. The receiver chain of claim 1, further comprising a plurality of channel matched filters, with at least one channel matched filter for each receive antenna.

3. The receiver chain of claim 2, wherein each channel matched filter operates with a channel model determined for the plurality of receive antennas with data detection used for coherent time averaging.

4. The receiver chain of claim 3, wherein the data detection is of signals prior to the vector Barker decoder.

5. The receiver chain of claim 1, further comprising:
   a plurality of Barker correlators, wherein each Barker correlator is associated with one of the plurality of received signals and outputs a correlator signal; and
   means for combining correlator signals output by the plurality of Barker correlators to form a combined correlator output signal.

6. The receiver chain of claim 5, further comprising a noise estimator coupled to receive the plurality of correlator signals, wherein the noise estimation is performed using at least one of a slicer variance, quadrature component variance, or a PLL detector variance and provided as input to the means for combining correlator signals, wherein the means for combining correlator signals weights the correlator signals according to a noise estimate prior to summing.

7. The receiver chain of claim 5, further comprising:
   means for determining channel matched filter coefficients for each of a plurality of channel matched filters, wherein at least one channel matched filter filters a signal for each receive antenna and wherein the Barker correlator for that receive antenna receives its corresponding received signal filtered by the at least channel matched filter;
   means for determining correlator signal weights for the plurality of received signals; and
   means for weighting the plurality of correlator signals according to the determined weights prior to the combination by the means for combining.

8. The receiver chain of claim 5, further comprising:
   a plurality of peak buffers that time average Barker correlation outputs to form channel estimates.

9. The receiver chain of claim 1, further comprising a phase locked loop phase detector that detects phase from the plurality of received signals.

10. The receiver chain of claim 1, further comprising a phase locked loop detector, wherein the phase locked loop detector detects phase from a combination of less than all of the plurality of received signals.

11. The receiver chain of claim 1, further comprising logic to determine a multi antenna estimate of frequency offset using the plurality of correlator signals.

12. The receiver chain of claim 1, further comprising a circuit for estimating a multi antenna correlation peak across receive antennas.

13. The receiver chain of claim 1, further comprising a PLL.

14. The receiver chain of claim 1, further comprising a multi antenna start field delimiter ("SFD") detector.

15. The receiver chain of claim 1, further comprising a combination start field delimiter ("SFD") detector that is capable of detecting SFD for at least one of a short preamble prior to descrambling and a long preamble after descrambling.

16. A receiver chain usable for wireless data communication, comprising:
   a plurality of receive antennas, wherein each receive antenna can receive a received signal of a plurality of received signals;
   a vector complimentary code keying ("CCK") decoder, wherein the vector CCK decoder operates on the plurality of received signals, thereby outputting a decoding signal that is dependent on at least two of the plurality of received signals.

17. The receiver chain of claim 16, further comprising a plurality of channel matched filters, with at least one channel matched filter for each receive antenna.

18. The receiver chain of claim 16, further comprising:
   means for determining signal to noise ratio (SNR) for each receive antenna;
   means for weighting the received signals according to the determined SNR;
   signal combiner to form a combined signal from the weighted received signals; and
   a CCK correlator coupled to receive the combined signal.

19. The receiver chain of claim 18, wherein weights are determined by one or more Barker correlators in a preamble encoded with a Barker sequence.

20. The receiver chain of claim 16, further comprising:
a common phase detector for the plurality of received signals; and
phase control inputs for each receive chain for a receive antenna, wherein the phase control input is a function of the output of the common phase detector.

21. The receiver chain of claim 16, further comprising a plurality of CCK correlators, wherein each CCK correlator correlates a received signal from one of the receive antennas and wherein the outputs of the plurality of CCK correlators are weighted and combined with the weighting being determined from antennas SNR.

22. The receiver chain of claim 16, further comprising logic to determine a multi antenna estimate of frequency offset using the plurality of correlator signals.

23. The receiver chain of claim 16, further comprising a circuit for estimating a multi antenna correlation peak across receive antennas.

24. The receiver chain of claim 16, further comprising a common PLL for frequency/offset correction across multiple receive chains.

25. The receiver chain of claim 16, further comprising a multi antenna start field delimiter ("SFD") detector.

26. A method of processing a plurality of signals received by a receiver chain, the method comprising:
receiving the plurality of signals using a plurality of receive antennas;
automatically controlling gain for each of the receive antennas to arrive at a plurality of gain controlled signals, each being a gain controlled signal corresponding to one of the plurality of signals;
determining an initial Barker correlation peak estimate from at least one of the plurality of signals and the plurality of gain controlled signals; and
estimating a multi antenna frequency offset on the plurality of received signals.

27. The method of claim 26, wherein determining an initial Barker correlation peak estimate comprises determining an initial Barker correlation peak estimate over the plurality of receive antennas from peak estimates of at least one of the plurality of signals and the plurality of gain controlled signals.

28. The method of claim 26, wherein determining an initial Barker correlation peak estimate comprises time averaging the sum of peak estimates of at least one of the plurality of signals and the plurality of gain controlled signals.

29. The method of claim 26, wherein estimating a multi antenna frequency offset on the plurality of received signals comprises:
estimating a frequency offset over each of the plurality of received signals over the plurality of receive antennas; and
combining the frequency offsets from each of the plurality of received signals to form an estimate of the multi antenna frequency offset.

30. The method of claim 29, wherein combining comprises:
time averaging phase changes measured of each receive antenna to derive a multi antenna phase difference; and
deriving an estimate of the multi antenna frequency offset from the multi antenna phase difference.

31. A method of processing a plurality of signals received by one or more receiver chain coupled to a plurality of receive antennas, the method comprising:
receiving the plurality of signals using the plurality of receive antennas; and
determining an initial Barker correlation peak estimate over the plurality of receive antennas from peak estimates of each of the plurality of signals, wherein the value of the initial Barker correlation peak estimate is dependent on peak estimates for at least two of the plurality of receive antennas.

32. The method of claim 31, wherein determining an initial Barker correlation peak estimate comprises time averaging the sum of peak estimates of the plurality of signals.

33. The method of claim 31, further comprising estimating a multi antenna frequency offset of the plurality of received signals.

34. The method of claim 33, wherein estimating a multi antenna frequency offset on the plurality of received signals comprises:
estimating a frequency offset over each of the plurality of received signals over the plurality of receive antennas; and
combining the frequency offsets from each of the plurality of received signals to form an estimate of the multi antenna frequency offset.

35. The method of claim 34, wherein combining comprises:
time averaging phase changes measured of each receive antenna to derive a multi antenna phase difference; and
deriving an estimate of the multi antenna frequency offset from the multi antenna phase difference.

36. The method of claim 31, wherein the peak estimates of at least two of the plurality of signals are nonzero and the initial Barker correlation peak estimate is a function of at least the two nonzero values.

37. The method of claim 31, wherein the initial Barker correlation peak estimate is a function of complex channel impulse response estimates for at least two of the plurality of signals.

38. A method of processing a plurality of signals received by a receiver chain, the method comprising:
receiving the plurality of signals using a plurality of receive antennas; and
determining an initial Barker correlation peak estimate over the plurality of receive antennas from peak estimates of each of the plurality of signals, wherein determining an initial Barker correlation peak estimate comprises time averaging the sum of peak estimates of the plurality of signals.

39. A method of processing a plurality of signals received by a receiver chain, the method comprising:
receiving the plurality of signals using a plurality of receive antennas at least two of which are received simultaneously; and
determining an initial Barker correlation peak estimate over the plurality of receive antennas from peak estimates of each of the plurality of signals, further comprising estimating a multi antenna frequency offset of the plurality of received signals.

40. The method of claim 39, wherein estimating a multi antenna frequency offset on the plurality of received signals comprises:
estimating a frequency offset over each of the plurality of received signals over the plurality of receive antennas; and combining the frequency offsets from each of the plurality of received signals to form an estimate of the multi antenna frequency offset.

41. The method of claim 40, wherein combining comprises:
   time averaging phase changes measured of each receive antenna to derive a multi antenna phase difference; and
   deriving an estimate of the multi antenna frequency offset from the multi antenna phase difference.

42. In a receiver having a plurality of receive chains, wherein each receive chain of the plurality of receive chains comprises circuitry to process a receive signal from a receive antenna associated with that receive chain, the receive antenna being one of a plurality of receive antennas, an improved signal processing circuit comprising:
   logic for estimating, for each of the plurality of receive chains, signal power and noise power from a Barker preamble received at corresponding receive antennas;
   logic for weighting each receive signal according to estimated signal power and noise power provided for each of the plurality of receive chains from the logic for estimating, to form a plurality of weighted receive signals at least dependent upon results of estimating from at least two of the Barker preambles;
   logic for combining the weighted receive signals to form an aggregate receive signal; and
   logic for further processing the aggregate receive signal to extract data from a transmitted signal received by the plurality of receive antennas.

43. The improved signal processing circuit of claim 42, wherein at least one of the logic for estimating, the logic for weighting, the logic for combining and the logic for further processing comprises a hardware circuit.

44. The improved signal processing circuit of claim 42, wherein at least one of the logic for estimating, the logic for weighting, the logic for combining and the logic for further processing comprises elements implemented as instructions to be executed by a digital signal processor.

45. The improved signal processing circuit of claim 42, wherein the logic for weighting comprises logic for multiplying each receive signal by the square root of its estimated signal power and dividing by its noise power.

46. The improved signal processing circuit of claim 45, wherein the logic for multiplying and dividing operates by coupling the multiplying and dividing results as weights for individual channel matched filters associated with each of the receive chains.

47. The improved signal processing circuit of claim 42, further comprising:
   logic for performing a frequency estimation and data detection over the plurality of receive antennas while estimation is done antenna by antenna.

48. The improved signal processing circuit of claim 42, wherein the plurality of weighted receive signals comprises nonzero weighted receive signals from at least two receive antennas and the aggregate receive signal is a function of at least the two nonzero values of weighted receive signals.

* * * * *